Dec. 13, 1955   J. H. BAKER ET AL   2,726,507
JET POWER PLANT CONTROLS
Filed Jan. 14, 1952   2 Sheets-Sheet 1

INVENTORS
John H. Baker
Wendell E. Reed
BY Strauch, Nolan & Diggins
ATTORNEYS

Dec. 13, 1955    J. H. BAKER ET AL    2,726,507
JET POWER PLANT CONTROLS
Filed Jan. 14, 1952    2 Sheets-Sheet 2

INVENTORS
John H. Baker
Wendell E. Reed
BY Strauch, Nolan & Diggins
ATTORNEYS

United States Patent Office 2,726,507
Patented Dec. 13, 1955

2,726,507

JET POWER PLANT CONTROLS

John H. Baker, Washington, D. C., and Wendell E. Reed, Chula Vista, Calif., assignors to Solar Aircraft Company, San Diego, Calif., a corporation of California Application January 14, 1952, Serial No. 266,258

21 Claims. (Cl. 60—35.6)

This invention relates to pressure and temperature responsive controls and control methods for the indication and regulation of flows in ducts and conduits. More particularly, the invention relates to operating controls for gas turbines, jet power plants and the like and is particularly adapted for use in jet power plants which include an afterburner to augment the thrust by reheating exhaust gases from the turbine.

During the early stages of successful afterburner development, a two-position nozzle was used having a closed area approximately equal to the normal nozzle area for the given primary jet engine. Its fully open area was designed to emit the reheated gases so that the turbine discharge outlet temperature and pressure continued to remain the same as during normal operation without afterburning. The primary concern at this time was that the nozzle should open fully upon the initiation of afterburning and close promptly within a fraction of a second after the termination of afterburning. During afterburning the turbine out temperature was held as nearly constant as possible by controlled metering of the fuel to the afterburner.

It has since been found, however, that controlled metering of afterburner fuel alone is not sufficient to enable truly efficient performance of the combined primary engine and afterburner. The reason for this is that the variation of fuel rate required to maintain constant turbine outlet temperature in such a system causes the fuel/air ratio to vary in a manner that reduces the efficiency of the afterburner at high altitude.

To overcome the foregoing problem and greatly increase the efficiency of two-position nozzle installations this invention provides a novel control system wherein vernier nozzle adjustment in either fully closed or fully open positions automatically maintains substantially constant turbine outlet temperature without adversely affecting the fuel/air ratio of the afterburner. The vernier nozzle adjustment is made possible through use of one of the more recently developed types of continuously variable nozzles although, as will be hereinafter more fully explained, the nozzle is not used in a wholly variable manner in the present system.

While the invention disclosed herein is still a substantially two-position system, it permits greatly improved afterburner and primary engine performance with a relative simplicity not generally achievable in continuously variable nozzle systems. Thus, the invention provides for rapid and automatic opening and closing of the nozzle when afterburning is initiated and terminated, and also provides vernier nozzle adjustment when the nozzle is in either open or closed position to hold constant the limiting turbine outlet temperature. In addition, the control system embodied herein provides for rapid automatic closing of the nozzle and shut off of afterburner fuel in the event of a blow-out or if the turbine outlet temperature exceeds the maximum permissible limit. Manual emergency nozzle controls are also provided in case of failure of the automatic controls for any reason.

Maintaining constant turbine outlet temperature by applying a continuous vernier correction to the nozzle rather than to afterburner fuel flow results in improved altitude performance of the afterburner, and improved specific fuel consumption and thrust of the primary engine during non-afterburning operation. For example, the afterburner altitude limit is appreciably raised and the specific afterburner fuel consumption above 25,000 feet is decreased, while increased thrust is possible during non-afterburning under all flight conditions.

With the foregoing and other considerations in view it is a primary object of this invention to provide a relatively simple afterburner control system which insures improved performance and greater efficiency in both the afterburner and primary engine in a jet power plant.

Another important object of the invention is to provide a simple afterburner control system wherein the afterburner nozzle is rapidly and automatically opened and closed when afterburning is initiated and terminated.

A further important object of the invention is the provision of a substantially two-position afterburner control system wherein vernier nozzle adjustment holds the turbine outlet temperature constant when the nozzle is in either open or closed position.

Another object of the invention is to provide an afterburner control system wherein the afterburner nozzle is automatically closed and afterburner fuel shut off in the event of a blow-out or if the turbine outlet temperature exceeds the maximum permissible limit.

Still another object of the invention is the provision of an afterburner control system having manual emergency nozzle controls for use in the event of failure of the automatic controls.

A further important object of the invention is the provision of an afterburner control system having a novel nozzle control unit which regulates the afterburner nozzle to open or closed positions and also finely adjusts the nozzle in either position to maintain a constant turbine outlet temperature.

Other objects and advantages will become apparent from the following detailed description taken in conjunction with the accompanying drawings and from the appended claims.

Figure 1:
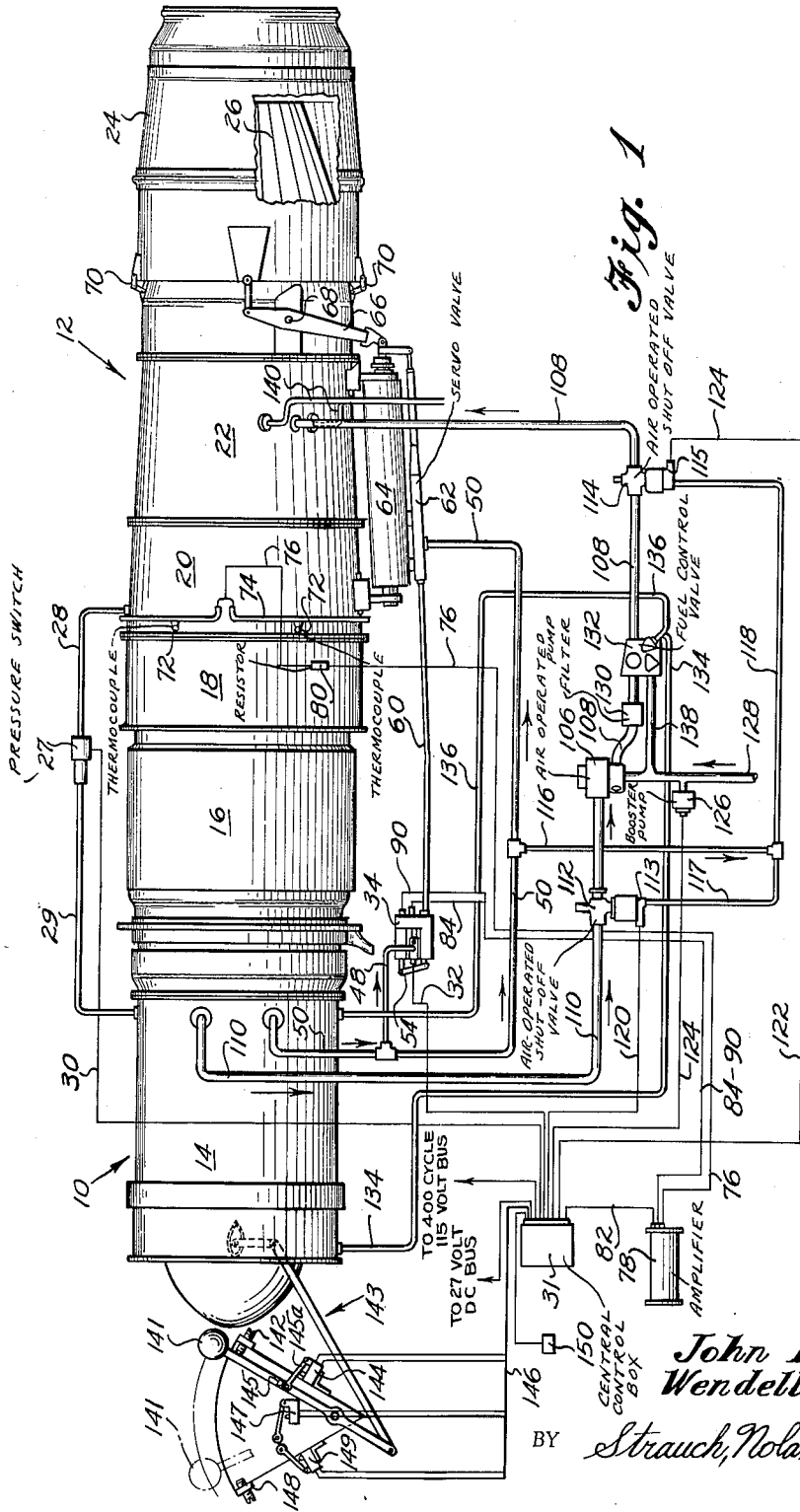
Figure 1 illustrates a conventional turbojet engine and afterburner provided with a control system in accordance with the invention.

Referring now to Figure 1 of the drawings, the jet power plant is comprised of a primary or turbojet engine generally indicated at 10 and an afterburner or afterburner tailpipe generally indicated at 12. The primary engine 10 is conventional and comprises a compressor 14, combustion chamber 16, turbine 18 and diffuser 20. The afterburner 12 comprises the burner area 22, shroud 24 and variable nozzle 26. The nozzle 26, schematically illustrated herein, may be any suitable one of the recently developed continuously variable types as mentioned hereinbefore. However, in the preferred embodiment of the invention the nozzle employed is of the continuously variable multi-flap type disclosed in copending application Serial No. 150,127, filed March 17, 1950 by Ralph Kress. Since the actual construction of this nozzle plays no part of this invention it will be but briefly described herein; for a more detailed description, reference may be had to the Kress application, supra. Certain other components of the control system of the invention are also the subjects of copending patent applications, and reference will be made to these applications as the description proceeds.

As pointed out hereinabove, one specific purpose of this invention is to provide a vernier nozzle adjustment for the substantially two-position nozzle in either of its closed or open positions to maintain a constant turbine outlet temperature. In other words, the nozzle has two basic positions, closed and open, and in either position it may be finely adjusted to form a slightly larger or smaller jet orifice area. This vernier adjustment is responsive to variations in the turbine discharge temperature so that if there is a slight temperature increase the nozzle will be adjusted to a wider open position regardless of whether the nozzle is in its basic open or closed position; conversely, if there is a slight temperature decrease the nozzle will be adjusted to a more closed position regardless of its basic position. The means to control the nozzle in this manner will now be described.

Nozzle control

In normal practice the nozzle 26 should be in its basic closed position during periods of no afterburning and in its basic open position when the afterburner is in operation. It is now well understood that the initiation of afterburning before the nozzle is opened, causes a significant pressure rise in the afterburner tailpipe 12 of the power plant and that the termination of afterburning, before the nozzle is closed, causes a significant pressure drop in the afterburner tailpipe. These significant pressure variations are accordingly sensed in the present invention to cause nozzle 26 to be moved to its proper position. To determine these significant variations a variable comparison pressure switch 27 is provided which senses afterburner tailpipe pressure through line 28 and compresser discharge pressure through line 29. The switch 27 uses the compressor discharge pressure to establish a simulated standard turbine discharge or afterburner tailpipe pressure and then compares this simulated standard pressure with the actual pressure in line 28 to produce an appropriate electrical signal. For a more detailed description of a pressure switch such as the switch 27 disclosed herein, reference may be had to copending application Serial No. 140,856, filed January 27, 1950 by Wendell E. Reed.

When the afterburner 12 is switched on by the pilot or operator, in a manner to be hereinafter described, the consequent pressure rise in afterburner tailpipe 12 is detected by the pressure switch 27 which sends a signal through conductor 30 to the central control box 31, to be explained. Control box 31 in turn relays the signal through conductor 32 to the solenoid 33, Figure 3, of a four-way solenoid valve in the nozzle control unit 34 which causes the nozzle 26 to be moved to its basic open position. Similarly, when the afterburner 12 is switched off by the pilot, or when a blow-out occurs and switch 27 detects the consequent pressure drop in afterburner tailpipe 12, a signal is sent via control box 31 to solenoid 33 which causes nozzle 26 to be moved to its basic closed position.

Figure 2:
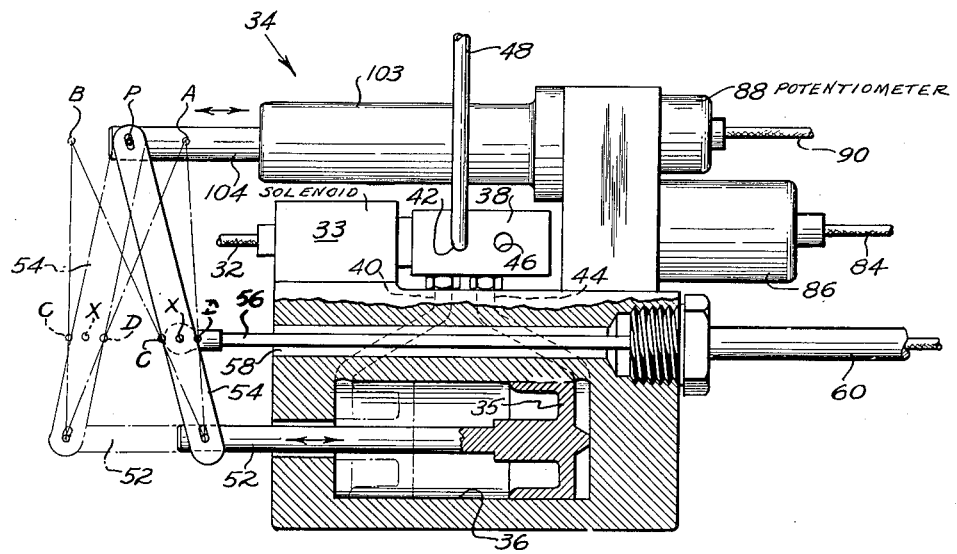
Figure 2 illustrates schematically the nozzle control unit of the control system of Figure 1.
Figure 3:
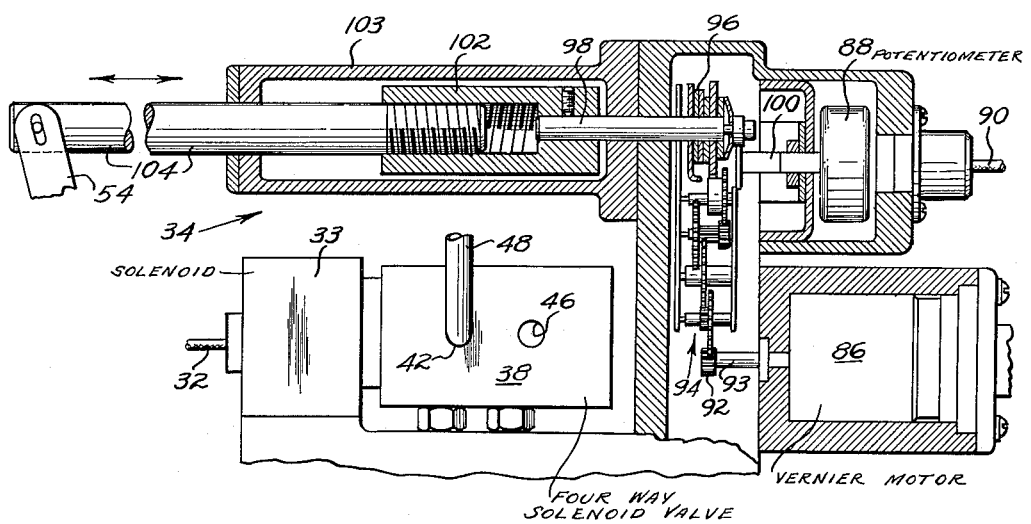
Figure 3 illustrates some of the details of the nozzle control unit of Figure 2.

The nozzle control unit 34, Figures 1, 2 and 3, is a single component which controls and coordinates both the basic movement of the nozzle 26 and the vernier adjustment thereof in a unique manner. The basic position of nozzle 26 is controlled by a piston 35 in an air cylinder 36 of the control unit 34. The position of piston 35 is in turn controlled by the solenoid 33 and valve element 38 of the four-way solenoid valve noted above. Accordingly, when solenoid 33 receives a signal to open nozzle 26, it positions valve 38 so that a passage 40 to the left end of air cylinder 36 communicates with the compressor air discharge connection 42 and a passage 44 to the right end of cylinder 36 communicates with an orifice 46 open to the atmosphere. This forces piston 35 to the right end of cylinder 36 as shown in solid lines in Figure 2. When solenoid 33 receives a signal to close nozzle 26, it positions valve 38 so that passage 44 communicates with connection 42 and passage 40 communicates with orifice 46 which forces piston 35 to the left as shown in phantom lines in Figure 2. The connection 42 communicates by means of a conduit 48 with the line 50 which conducts compressed air from the discharge side of the compressor to various valves and actuators of the control system.

Piston 35 is integral with a piston rod 52 which is secured at its outer end to an operating bar 54 by a pin and slot connection. Bar 54 is connected near its mid-point to a rod 56 which passes through a bushing 58 in nozzle control unit 34 and is connected at its other end by means of a push-pull linkage 60 to an actuator servo valve 62, Figure 1. Servo valve 62 controls the passage of compressed air from line 50 into a pneumatodraulic actuator or booster 64 which actually causes the nozzle movement. By means of a servo or feed back arrangement the working piston (not shown) of the actuator 64 is locked in any position into which it is moved until a new signal is received by the servo valve 62. In the preferred embodiment of the invention the actuator 64 and servo valve 62 will be of the type disclosed in copending application Serial No. 178,952, filed August 11, 1950 by Ralph Kress, now Patent No. 2,698,605 issued Jan. 4, 1955, and for a more detailed description thereof reference may be had to that patent.

The working piston of actuator 64 is secured to the mid-point of a yoke member 66 pivoted for swinging movement at opposite points 68 (only one of which is shown) on the afterburner 12. The upper ends of yoke 66 are linked as shown to diametrically opposite points on the shroud 24 which is hinged to the afterburner at 70 for axial movement in response to the movement of the working piston. Axial movement of shroud 24 in turn actuates the multiflap nozzle 26 to open or close it in accordance with the direction of the axial movement. As noted hereinbefore, the actual construction of nozzle 26 plays no part of this invention and for a more detailed description of the nozzle and its actuation by movable shroud 24 reference may be had to copending application Serial No. 150,127, supra. It will be understood from the foregoing, however, that movement of piston 35 will be transmitted through bar 54, rod 56, linkage 60, actuator 64 and shroud 24 to move nozzle 26 to its basic open or closed position depending upon the direction of movement of the piston.

It will be noted that cooling shroud 24 serves a dual purpose since it not only directs cooling ambient air flow around the outer area of the nozzle 26 but also acts as an important element in the nozzle actuating linkage. This latter usage assures rigidity of the actuating mechanism at a point where previous linkages have shown a strong tendency to buckle and warp under the high exhaust heats encountered, and eliminates further movable linkage which would be necessary if a stationary shroud were used.

The vernier adjustment of nozzle 26 in either the open or closed position is controlled by means of four thermocouples 72, having terminals of suitable materials as for example Chromel and Alumel. Thermocouples 72 are mounted in bosses welded to the diffuser section 20, and are spaced at intervals around the diffuser circumference. The thermocouple terminals are connected in parallel to mating terminals on a thermocouple harness 74 which is preferably a heat resistant cable sheathed in stainless steel metal braid. The dissimilar metals at the tip of thermocouples 72 generate a small D.-C. voltage which varies with the temperature of the turbine discharge gases or, as stated hereinabove, with the turbine outlet temperature. This voltage is transmitted from harness 74 by means of suitable wiring 76 to an amplifier 78. A resistor 80 is installed in the circuit between the harness 74 and amplifier 78 to provide a means of adjusting the total resistance of the circuit to the same value in each afterburner installation.

Amplifier 78 is a hermetically sealed cylindrical housing enclosing an assembly, not shown, of Microsen units, vacuum tubes, a power and output transformer and other necessary items of associated equipment. The amplifier 78 receives 115 volt, 400 cycle, single phase, A.-C. power from control box 31 through conductor 82, and a low voltage variable thermal-generated D.-C. signal from thermocouples 72 proportional to the turbine outlet temperature. It transforms the power circuit into a 50 volt, 400 cycle, two phase, A.-C. controlled power which is delivered through conductor 84 to a vernier motor 86, Figures 2 and 3, in nozzle control unit 34. The power delivered to vernier motor 86 is varied by the low voltage thermocouple circuit fluctuations and stabilized by feed back signals from a potentiometer 88 in control unit 34 which are transmitted to amplifier 78 through a conductor 90. The amplifier per se plays no part of this invention; however, for a more detailed description thereof reference may be had to the article "Anti-Hunt Servo Amplifier," by J. F. Engelberger in the February 1950 issue of Electrical Manufacturing.

The vernier motor 86 is a two phase, squirrel cage, explosion proof motor powered by amplifier 78 as described above. It is capable of reversing the direction of rotation in one-tenth of a second. The motor includes two separate 50 volt windings, one continuously excited and one controlled by the amplifier to vary the speed and direction of rotation. When the control winding voltage is shifted in phase by 180 degrees the motor reverses. The motor speed at any time, assuming a constant excitation voltage, is approximately proportional to the magnitude of the control voltage. A pinion 92, Figure 3, on the end of the motor shaft 93 meshes with a gear train, generally indicated at 94, which acts through a friction clutch 96 to rotate the vernier control shaft 98 and potentiometer shaft 100. Fixed on control shaft 98 is the drive member 102 of a screw jack 103 having threaded engagement with a screw rod 104. While the rotational movement of motor shaft 93 is translated into linear movement by means of screw jack 103 in the illustrated construction, it will be understood that any other suitable differential means such as a rack and gear arrangement might be used with the same results.

At its outer end screw rod 104 is secured by means of a pin and slot connection to the upper end of operating bar 54. Referring again to Figure 2, it will be seen that point "P" at the pin and slot connection of rod 104 and bar 54 can be moved within the range determined by points "A" and "B" depending upon the rotation of vernier motor 86. It will also be seen that point "P" can be moved within this range regardless of the position of piston rod 52 secured to the lower end of bar 54. Since rod 56 is also secured to the lower end of bar 54 movement of point "P" within the range of "A" and "B" will cause point "X" at the connection between the bar 54 and rod 56 to move within a smaller range determined by the points "C" and "D." As with point "P," point "X" can be moved within this smaller range regardless of whether piston 35 is in its left or right hand position. It will be understood, therefore, that while piston 35 acting through bar 54 and rod 56 controls the basic open and closed positions of nozzle 26, the thermocouple controlled screw jack 103 acting through the same bar and rod controls the vernier nozzle adjustment in either of the basic positions. Thus, the relatively small nozzle control unit 34 coordinates the basic and vernier nozzle controls so that unit 34 has but a single output, and a single nozzle actuator 64 is all that is needed for both controls.

*Fuel control*

Afterburner fuel is pumped from a fuel supply tank, not shown, by means of a conventional air operated pump 106 and delivered through line 108 to the afterburner fuel manifold. Compressed air to drive pump 106 is delivered from the compressor discharge through line 110. Air operated shut-off valves 112 and 114 are located in air line 110 and fuel line 108, respectively. Valves 112 and 114 are controlled by solenoids 113 and 115, respectively, and are operated by compressed air from air line 50 by means of a connecting line 116 having branches 117 and 118 communicating with valves 112 and 114, respectively. Solenoid 113 is connected with the control box 31 by a lead 120, while solenoid 115 is connected with the control box by lead 122. Also connected with control box 31 by means of a lead 124 is the fuel booster pump 126 on the intake line 128 of pump 106. When the signal to initiate afterburning is received by control box 31, as will be hereinafter more fully explained, solenoids 113 and 115 are actuated to cause normally closed valves 112 and 114 to open, and booster pump 126 is put into operation. This initiates operation of pump 106 and fuel is pumped from the fuel source and discharged into line 108 leading to the afterburner fuel manifold.

A filter 130 and a pressure operated fuel control valve 132 are located in line 108 between pump 106 and the afterburner. Valve 132 meters the fuel to the afterburner, and is controlled by a linear function of the difference in the compressor inlet and discharge pressures. Air bled from the compressor inlet and discharge is delivered to valve 132 through lines 134 and 136, respectively. The actual construction of valve 132 plays no part of this invention; for a more detailed description reference may be had to copending application Serial No. 185,124, filed September 15, 1950, by Robert E. Day. Excess fuel is conducted back to the intake line 128 from valve 132 by means of line 138.

Adjacent the connection between fuel line 108 and the burner area 22 of the power plant are two high-tension leads 140 which may be connected to a conventional source of electric power, not shown. Each lead 140 is connected to a suitable type of igniter within the afterburner, as for example a high-tension spark plug, not shown. The igniters serve to ignite the combustible mixture formed by injecting fuel from the fuel manifold into the primary engine exhaust gases.

*Central control box*

The electrical controls for the control system disclosed are centered in the central control box 31 which distributes power from the aircraft electrical supply to the electrically controlled elements of the system. The electrical details of this control box, i. e. the operation of the electrical circuits in combination with the electrical units therein, play no part of this invention and will be only generally described herein. However, for a detailed disclosure of a similar control box reference may be had to copending application Serial No. 185,115 for Afterburner Electric Controls, filed September 15, 1950 by Philip M. Klauber.

The primary electrical units in control box 31 are five hermetically sealed relays, each having a plurality of sets of contacts. These relays are secured to a mounting plate in the box and are interconnected in the manner disclosed in Serial No. 185,115, cited above, by circuits which are also wired to prong and socket receptacles on the side of the box. These internal control box circuits are protected by a 15 amp. push-pull overload circuit breaker.

*Operation*

The power plant is put into operation and controlled, to the extent necessary, by the pilot or operator by means of the manually operated throttle 141. Before operation starts throttle 141 is in the extreme right or "Off" position against an adjustable stop 142. To start operation the throttle is moved to the left, or in a counterclockwise direction, Figure 1, to the "Idle" position. Moving throttle 141 into the "Idle" position causes the primary engine to fire and accelerate to idling speed through a linkage generally indicated at 143. It also closes an afterburner arming switch 144 as cam-shaped pin 145 on the throttle lever releases actuating arm 145a of the switch; this completes a circuit from the aircraft D.-C. source through a first relay in control box 31 causing it to become energized. The energized relay in turn closes a contact allowing D.-C. voltage to be applied to the normally open contacts of the remaining relays in the control box so that they are in condition for instant response to further operation. In addition, the energized relay closes other contacts completing the circuit which supplies the 115 volt, 400 cycle A.-C. power from the aircraft source to the fuel control amplifier 78. The electrical controls are thus placed in a state of readiness for immediate response to further signals. A cable 146 carries all the electrical leads between the throttle actuated switches and control box 31.

To accelerate the primary engine to its maximum speed the throttle 141 is moved farther to the left on the throttle quadrant into the "Maximum Dry Thrust" position as shown by phantom lines. This also closes the vernier switch 147 putting vernier motor 86 of the nozzle control unit 34 into operation. At this stage of the power plant operation afterburner 12 is still inactive and nozzle 26 is in its basic closed position. However, the turbine discharge temperature signals originating in thermocouples 72 are transmitted to the amplifier 78 which powers vernier motor 86. Motor 86 acting in conjunction with potentiometer 88 as hereinbefore described continuously controls the vernier adjustment of nozzle 26 so as to maintain the turbine discharge temperature at a substantially constant value for all flight conditions. It should be noted here that vernier switch 147 may also be used in a manner that will provide a predetermined, fixed nozzle position at throttle positions below "Maximum Dry Thrust"; i. e. a slightly larger than normal area at cruise speeds generally improves specific fuel consumption.

When the added thrust provided by afterburning is desired throttle 141 is advanced to the "Afterburning" position, or to its extreme left position, Figure 1, against adjustable contact 148. This closes an afterburner firing switch 149 on the throttle which completes a D.-C. circuit which starts a booster pump, not shown. When boost pressure rises, pressure switch 126 closes, energizing a second relay in the control box 31 which in turn actuates solenoids 113 and 115 to open shut-off valves 112 and 114, and cause electrical energy to be released at the igniters. The opening of valve 112 allows pump 106 to operate and fuel is then pumped through metering valve 132 on line 108 to the afterburner fuel manifold. Fuel injected from the manifold mixes with the exhaust gases from the primary engine and the resultant mixture is ignited by the igniters to initiate afterburner combustion.

The pressure rise caused by the initiation of afterburning is sensed by pressure switch 27 which sends a signal to control box 31 and energizes a third relay. The energized third relay in turn closes a set of contacts which energizes solenoid 33 in nozzle control unit 34 causing piston 35 to operate nozzle actuator 64 and move nozzle 26 to its basic open position. Energizing the third relay also causes a set of contacts closed by the second relay to be opened, thus deenergizing the igniters which are normally needed only to initiate combustion. It will be understood that the operations in the foregoing sequence occur practically simultaneously so that, in fact, afterburner combustion is initiated and nozzle 26 moved to its basic open position within one second after throttle 141 is moved into its "Afterburning" position. As explained hereinbefore, once nozzle 26 has been moved to basic open position there will be continuous vernier adjustment of the nozzle to maintain the turbine discharge temperature at a substantially constant value.

To terminate afterburning throttle 141 is moved back into the "Maximum Dry Thrust" position. This opens the afterburner firing switch 149 which stops the booster pump and deenergizes the second and third relays in the control box 31 so that the shut-off valves 112 and 114 are closed and nozzle 26 is returned to closed position.

The preceding paragraph describes the normal termination of afterburning. In the event of an inadvertent shutdown for some reason, such as a blowout, the following sequence of operations takes place assuming that throttle 141 is still in "Afterburning" position, and therefore that the afterburner firing switch is still closed. The loss of combustion creates a pressure drop in afterburner tailpipe 12 which is sensed by pressure switch 27. The signal from switch 27 energizes a fourth relay in control box 31 causing nozzle 26 to be returned to its basic closed position, and causing afterburner fuel to be shut off through the closing of valves 112 and 114. Energizing the fourth relay causes contacts to open which deenergize the second relay causing shut-off valves 112 and 114 to be closed. The fourth relay will remain energized preventing further afterburning until the afterburner filling switch is again opened. In other words, the operator must move throttle 141 out of its afterburning position before a normal start can again be made.

A further safeguard to the afterburner is the provision of an automatic shut-down relay in amplifier 78. Thus, if the turbine outlet temperature measured by thermocouples 72 exceeds a prescribed limit the shutdown relay in the amplifier is energized and transmits a signal to control box 31 which causes the termination of afterburning in accordance with the normal termination sequence.

An emergency manual nozzle switch 150, Figure 1, may also be provided for the operator so that in an emergency he can directly open or close the nozzle 26.

From the foregoing it will be apparent that the invention embodied herein provides a novel automatic control system for a jet power plant wherein vernier nozzle adjustment in either of the basic nozzle positions maintains a substantially constant turbine outlet temperature without adversely affecting the fuel/air ratio in the plant. This control enables highly efficient engine performance under all flight conditions and appreciably raises the afterburner altitude limit. The improved control system is made so in part by a novel nozzle control unit which coordinates the basic nozzle control and vernier control so that but a single nozzle actuator is necessary to apply both types of control to the nozzle. In addition, the control system disclosed provides for rapid automatic opening of the nozzle upon initiation of afterburning, and rapid closing of the nozzle upon voluntary or inadvertent termination of afterburning. Other safeguards are likewise provided for the protection of the entire power plant and, most important, for the safety of the aircraft and its pilot.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A jet power plant comprising a primary engine, an afterburner tailpipe secured to said primary engine, a variable area jet nozzle mounted on said afterburner tailpipe, nozzle actuating means to vary the area of said nozzle, means responsive to pressure variations within said tailpipe to control said nozzle actuating means to move said nozzle into its basic open or closed positions, and means responsive to temperature variations within said tailpipe to control said nozzle actuating means to apply vernier adjustment to said nozzle in either of its said basic positions.

2. A jet power plant as defined in claim 1, wherein said pressure responsive means and said temperature responsive means deliver signals to a single coordinating unit operably connected to said nozzle actuating means.

3. A jet power plant comprising a primary combustion device, a selectively operable secondary combustion device secured to said primary combustion device, a variable area nozzle mounted on said secondary combustion device, means responsive to pressure variations produced by the selective operation of said secondary combustion device to control the movement of said nozzle to its basic open or closed positions, and means responsive to temperature variations within said power plane to control vernier adjustment of said nozzle in either of its said basic positions.

4. In a jet power plant having a turbine and a variable area jet nozzle; an actuator for said nozzle, primary control means responsive to pressure variations in said engine downstream of said turbine for operating said actuator to move said nozzle to open or closed positions, and secondary control means responsive to temperature variations in said engine downstream of said turbine to operate said actuator to apply vernier adjustments to said nozzle in said opened or closed position independently of said primary control means.

5. In a jet power plant, a primary engine, an afterburner tailpipe secured to said primary engine having a variable area nozzle, means to supply fuel to said afterburner tailpipe, means to initiate combustion of said fuel in said afterburner tailpipe, means responsive to pressure variations within said tailpipe to control movement of said nozzle to its basic open position when combustion is initiated in said afterburner tailpipe and to its basic closed position when combustion is terminated, and means responsive to temperature variations within said tailpipe to apply vernier adjustment to said nozzle in either of its said basic positions.

6. A jet power plant as defined in claim 5, wherein said primary engine includes a compressor and said fuel supply means includes means to regulate the fuel flow responsive to variations in pressure rise across said compressor.

7. In a jet power plant, a primary engine having an air compressor and a turbine, a selectively operable afterburner secured to said primary engine having a variable area nozzle, a nozzle actuator to vary the area of said nozzle, a nozzle control means to control said nozzle actuator, means responsive to pressure variations in said engine produced by the selective operation of said afterburner to actuate said control means to cause said actuator to move said nozzle to its basic open or closed position, and means responsive to temperature variations in said engine produced by the selective operation of said afterburner to actuate said control means to cause said actuator to apply vernier adjustment to said nozzle in either of its said basic positions.

8. In a jet power plant, a primary engine having an air compressor and a turbine, an afterburner secured to said primary engine having a variable area nozzle, a movable cooling shroud member surrounding said nozzle, a nozzle actuator operably connected through said movable cooling shroud to vary the area of said nozzle, a nozzle control means to control said nozzle actuator, pressure responsive means to actuate said control means to cause said actuator to move said nozzle to its basic open or closed position, and temperature responsive means to actuate said control means to cause said actuator to apply vernier adjustment to said nozzle in either of its said basic positions.

9. In a jet power plant, a primary engine having an air compressor and a turbine, an afterburner secured to said primary engine having a variable area nozzle, a nozzle actuator to vary the area of said nozzle, an operating member operatively connected to said nozzle actuator, piston means connected to said operating member, pressure responsive means to actuate said piston means to cause said actuator to move said nozzle to its basic open or closed position, a differential means connected to said operating member, and temperature responsive means to actuate said differential means to cause said actuator to apply vernier adjustment to said nozzle in either of its said basic positions.

10. A jet power plant as defined in claim 7, wherein said pressure responsive means includes a pressure operated switch controlled by turbine outlet pressure variations.

11. In a jet power plant, a primary engine having an air compressor and a turbine, an afterburner secured to said primary engine having a variable area nozzle, a nozzle actuator to vary the area of said nozzle, a nozzle control means to control said nozzle actuator, pressure responsive means to actuate said control means to cause said actuator to move said nozzle to its basic open or closed position, and temperature responsive means to cause said actuator to apply vernier adjustment to said nozzle in either of its basic positions, said temperature responsive means including a plurality of thermocouples located downstream of said turbine and means to amplify the signals received from said thermocouples.

12. A jet power plant as defined in claim 7, including means to supply fuel to said afterburner, and means to initiate combustion of said fuel in said afterburner.

13. In a jet power plant, a primary engine having an air compressor and a turbine, an afterburner secured to said primary engine having a variable area nozzle, means to supply fuel to said afterburner including flow regulating means responsive to variations in pressure rise across said compressor, means to initiate combustion of said fuel in said afterburner, a nozzle actuator to vary the area of said nozzle, a nozzle control means to control said nozzle actuator, pressure responsive means to actuate said control means to cause said actuator to move said nozzle to its basic open or closed position, and temperature responsive means to actuate said control means to cause said actuator to apply vernier adjustment to said nozzle in either of its basic positions.

14. In a jet power plant, a primary jet engine having a turbine; an afterburner secured to said primary engine having a variable area nozzle; means to supply fuel to said afterburner; means to initiate combustion of said fuel in said afterburner; pressure responsive means actuated by the pressure rise created by said afterburner combustion to cause said nozzle to move to its basic open position; and temperature responsive means to apply vernier adjustment to said nozzle in its basic open position including a plurality of thermocouples located downstream of said turbine and means to amplify the signals received from said thermocouples.

15. A jet power plant as defined in claim 14 including means to automatically shut off the fuel supply in the event of an inadvertent termination of afterburner combustion.

16. A jet power plant as defined in claim 14, wherein said amplifying means includes means to terminate afterburner combustion whenever said thermocouples indicate temperatures higher than a prescribed limit.

17. In a jet power plant, a primary engine including a turbine, an afterburner secured to said primary engine having a variable area nozzle, means to detect substantial variations in turbine discharge pressure from a simulated standard turbine discharge pressure, means actuated by said detecting means to cause movement of said nozzle to its basic open position whenever a substantial pressure rise is detected or to its basic closed position whenever a substantial pressure drop is detected, and temperature responsive means to control further vernier adjustment of said nozzle regardless of the basic position into which it is moved by said last-named means.

18. In a jet power plant having a variable area jet nozzle; a nozzle actuator; and a nozzle control unit comprising an operating member operatively connected to said actuator, a piston member connected to said operating member and controlled by pressure responsive means to cause said actuator to move said nozzle into its basic open or closed position, and a differential member connected to said operating member and controlled by temperature responsive means to cause said actuator to apply vernier adjustment to said nozzle in either of its said basic positions.

19. In a jet power plant including a turbine and a variable area nozzle; means to detect substantial variations from normal in the turbine discharge pressure; a plurality of thermocouples located downstream of said turbine; amplifying means connected to said thermocouples to amplify the signals received therefrom; and a nozzle control unit comprising a piston to control movement of said nozzle into its basic open or closed position, a valve member actuated by said pressure detecting means to control the position of said piston, a differential member to control the vernier adjustment of said nozzle in either of its said basic positions, a motor operated by signals received from said amplifying means to control the position of said differential member, and a feed-back potentiometer operatively connected between said motor and said amplifying means to stabilize operation of said motor.

20. A power plant as defined in claim 19 including a nozzle actuator to vary the area of said variable area nozzle; and said nozzle control unit including an operating member operatively connected to said piston, differential member and said nozzle actuator.

21. In a jet power plant, a primary jet engine having a turbine; an afterburner secured to said primary engine having a variable area nozzle; a nozzle actuator; pressure responsive means actuated by the pressure rise in said engine caused by operation of the afterburner to operate said actuator to cause said nozzle to move to its basic open position; and additional means responsive to an operating condition in said engine downstream of said turbine to operate said actuator to apply adjustment to said nozzle in its basic open position.

References Cited in the file of this patent

UNITED STATES PATENTS

| 2,623,352 | Sédille et al. | Dec. 30, 1952 |
| 2,653,446 | Price | Sept. 29, 1953 |
| 2,677,233 | Jordan | May 4, 1954 |

FOREIGN PATENTS

| 990,332 | France | June 6, 1951 |
| 990,336 | France | June 6, 1951 |